United States Patent
Hashimoto et al.

[11] 4,385,365
[45] May 24, 1983

[54] DATA SHUNTING AND RECOVERING DEVICE

[75] Inventors: Masahiro Hashimoto, Sagamihara; Kenichi Wada, Zama; Chikahiko Izumi, Hadano, all of Japan

[73] Assignee: Hitachi, Ltd., Tokyo, Japan

[21] Appl. No.: 10,470

[22] Filed: Feb. 8, 1979

[30] Foreign Application Priority Data

Feb. 13, 1978 [JP] Japan ................... 53/15224

[51] Int. Cl.³ .................. G06F 9/00; G06F 13/00
[52] U.S. Cl. .................................................. 364/900
[58] Field of Search ........................... 364/200, 900

[56] References Cited

U.S. PATENT DOCUMENTS

| | | | |
|---|---|---|---|
| 3,781,810 | 12/1973 | Downing | 364/200 |
| 3,792,439 | 2/1974 | Auspurg et al. | 364/200 |
| 3,898,623 | 8/1975 | Cormier | 364/200 |
| 3,909,794 | 9/1975 | Soltsien | 364/200 |
| 4,003,028 | 1/1977 | Bennett et al. | 364/200 |
| 4,040,030 | 8/1977 | Cassonnet | 364/200 |
| 4,048,481 | 9/1977 | Bailey et al. | 364/200 |
| 4,091,447 | 5/1978 | Dillon et al. | 364/200 |
| 4,095,268 | 6/1978 | Kobayashi et al. | 364/200 |
| 4,161,026 | 7/1979 | Wilhite | 364/200 |

*Primary Examiner*—Gareth D. Shaw
*Assistant Examiner*—John G. Mills, III
*Attorney, Agent, or Firm*—Antonelli, Terry & Wands

[57] ABSTRACT

A data shunting and recovering device is provided to shunt and hold the data stored in a register and its address before writing the register during a delay period following generation of an interrupt. This data is then restored into the register when an instruction of recovering is given. Therefore, it is allowed to achieve the moderating effects of delaying the stopping of the stage advance in data processing upon generation of an instruction for interruption without loss of data stored in the memory prior to writing during this delay period.

5 Claims, 9 Drawing Figures

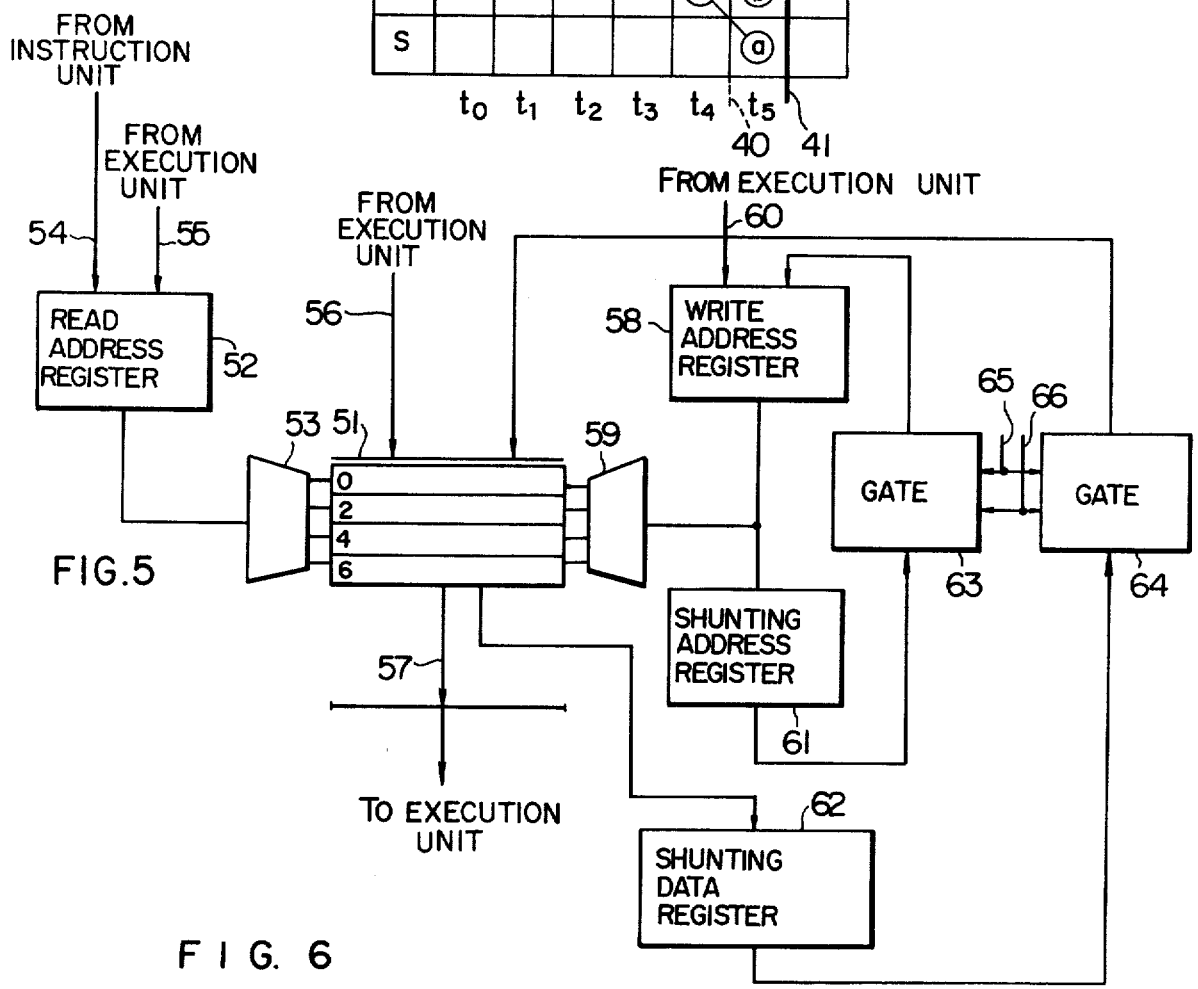

DATA SHUNTING AND RECOVERING DEVICE

BACKGROUND OF THE INVENTION

The present invention relates to a device for shunting and recovering data.

An information system is generally provided with an interrupting function for changing the processing condition of a central processor based upon such interruption sources as a request from the outside of the central processor, a condition generated within the central processor, and a condition generated in an input/output device.

When an interrupt is generated, the central processor suspends the program which has been executed up to that time, and executes the interrupt processing program. This shift from the suspended instruction to the interrupt processing program is done through change of the program status word (PSW) which decides the operation of the central processor. When the processing of the interrupt processing program terminates, the central processor should return to the program which was executed prior to the generation of the interrupt. For this purpose, it is required to load a correct PSW at the time of generation of the interrupt for indicating the address of an instruction word which is to be subsequently processed.

The PSW includes eight bytes or so indicative of control information of programs executed by the central processor such as an instruction address, an instruction length code, a condition code, a memory protection key, an interruption code indicating the interruption source, and an interrupt mask indicating whether the generation of such interrupt is permitted or not. When an interrupt is generated, the PSW for the program which has been executed up to that time (hereinafter referred to as old PSW) is stored in a predetermined address of the main storage, and there is subsequently read out of a predetermined address of the main storage a PSW specifying the control information of the interrupt processing program (hereinafter referred to as new PSW). The execution of the interrupt processing program starts according to the instruction in the main storage stored at an instruction address specified by the new PSW.

When the interrupt is generated, the instruction which is being executed performs one of the following types of end operation in accordance with the existing interruption source: (1) Completion, (2) Nullification, (3) Suppression, and (4) Termination.

In the completion-type end operation, even when an interruption source is generated, the instruction is normally completed, the result obtained is stored in an operand address indicated by the instruction, and the condition code is renewed. The instruction address in the old PSW which is stored in the predetermined address of the main storage indicates an instruction which is to be subsequently executed.

In the nullification-type and the suppression-type interruption, the interruption source is detected immediately before the instruction is started so that the interrupted instruction is not executed at all. That is, the operand and the condition code given by the interrupted instruction are maintained as they were before the instruction is executed. However, the instruction address in the old PSW is set in different manners between the nullification-type and suppression-type end operations. That is, in the nullification-type end operation, the instruction address in the old PSW is set to designate the interrupted instruction itself, while, in the suppression-type end operation, the instruction address is set to designate an instruction which is to be executed subsequently to the interrupted instruction.

In the termination-type end operation, the execution of instruction is suspended at the time when an interruption source is generated. Thus, it is not possible to anticipate the state of operand and the condition code which are specified by the instruction. The instruction address in the old PSW indicates the address of an instruction which is to be executed subsequently to the interrupted instruction.

The foregoing description shows the manner in which the interrupt function is normally conducted in a typical information processing apparatus. Although there are many information processing apparatuses in which the interrupt is processed in different manners from the above-mentioned, all the information processing apparatuses are the same in that the interrupted instruction ends according to the aforementioned types of end operation such as the completion, nullification, supression and termination types. Therefore, the present invention is applicable to any information processing apparatus irrespective of how the interrupt is carried out.

As is well-known, a central processor is connected with a main storage which is further connected with another central processor or with a plurality of input/output channels. In general, the central processor includes an instruction unit (I unit), an execution unit (E unit), a buffer storage, an address translation table, and further includes a storage control unit (S unit) which is connected with the main storage. In the central processor, the instruction unit reads an instruction out of the storage control unit, and produces various kinds of operand data and control signals which are communicated to the execution unit in order that the execution unit can perform the processing specified by the instruction. The execution unit performs according to the operand data prepared by the instruction unit such operations as arithmetic operation, logical operation, character shift and processing of control information in the processor, and then stores the results of operations in the register, storage, or the like which is specified by the instruction.

Each instruction is processed at five stages of D, A, L, E and P in a manner as mentioned below. The operation at each stage terminates in a machine cycle which is defined in the central processor.

Now, let us suppose a fundamental processing of an addition instruction by which the operand data in the storage and contents of a general purpose register included in the processor are added and the result of addition is stored in the general purpose register. First, the instruction unit reads out of the storing control unit an instruction which is to be subsequently executed. Then, in order to determine the operand address in the storage, there are added at the D stage (decode) the contents of a base register specified by the instruction word, the contents of an index register, and a displacement. Thus, the operand address is obtained. At the A stage (association), the operand address obtained at the D stage is sent to the storage control unit, and the storage control unit indexes an address translation management table and a buffer memory management table to obtain a buffer memory address by which a buffer memory can be accessed. At the L stage (load), the operand data is read out of the buffer memory in the storage control unit, and transferred to the execution unit. The instruction unit reads out the contents of the general purpose register which are another operand of the instruction according to a register address specified by the instruction word, and transfers the read contents of the execution unit. Thus, the execution unit includes on the termination of the L stage the operand data necessary for the operation specified by the instruction. When the instruction advances to the L stage and the necessary operand data and control information are given to the execution unit, the subsequent processing of the instruction relies on the execution unit. After receiving the operand data, the execution unit finishes the execution of instruction in two cycles of the E and P stages (execution and put-away). That is, at the E stage, the register operand and the operand on the storage are added. At the P stage, the result of addition is stored in the general purpose register specified by the instruction. Thus, the execution of instruction terminates.

Even if the instruction specifies that the result of operation is stored in the storage and in a register of another processor or is stored as the condition code, the resultant operands are all stored at the P stage.

In the foregoing description, the processing of a single instruction is performed at the five stages of D, A, L, E, and P. However, those processors in which a high speed processing is required, are constructed in such a manner that the respective stages can be independently operated. For example, in the E unit, the operand address of an instruction is obtained in a certain cycle, and the operand address of the succeeding instruction can be obtained in the next cycle. This is called the pipe-line control. In such a control, the successive instructions terminate successively with a one cycle shift, though five cycles are required for processing of each instruction.

The processing performance in the pipe-line control can be seen from a simplified stage flow shown in Table 1.

TABLE 1

| | | CYCLE | | | | | | |
|---|---|---|---|---|---|---|---|---|
| | | $t_0$ | $t_1$ | $t_2$ | $t_3$ | $t_4$ | $t_5$ | $t_6$ |
| STAGE | D | a | b | c | d | e | e | f |
| | A | | a | b | c | d | d | e |
| | L | | | a | b | c | c | d |
| | E | | | | a | b | b | c |
| | P | | | | | a | | b |

Table 1 shows a manner in which six instructions a, b, c, d, e and f are carried out. In a cycle $t_0$, the D stage operation of instruction a is performed, so that the operand address is defined. In a cycle $t_1$, the instruction a is shifted to the A stage where the buffer memory address is obtained in the storage control unit. The instruction a is shifted to the L stage in a cycle $t_2$, to the E stage in a cycle $t_3$, and to the P stage in a cycle $t_4$. Thus, the processing of the instruction a is completed in a period from $t_0$ to $t_4$. In the cycle $t_1$ when the instruction a is shifted to the A stage, the D stage processes the succeeding instruction b. In the cycle $t_2$, the A and D stages process the instructions b and c, respectively. Further, according to Table 1, it is shown at the E stage in cycles $t_4$ and $t_5$ that the operation of the instruction b at the E stage is not completed in one cycle, but requires two cycles. Such a situation takes place for an instruction of which an operation can not be completed in one cycle, such as an instruction indicating multiplication/division, or the like. In such a case, the instructions subsequent to the instruction b are, as shown in Table 1, maintained at the same stage for two cycles, because of the occupation of the E stage by the instruction b for two cycles. In the foregoing, there has been shown the general operation of the pipe-line control.

When the previously-mentioned interruption sources are generated in a processor which is controlled in the pipe-line control mode, the operand specified by the instruction has to be maintained in a stage existing prior to the execution of the instruction in the nullification-type or suppression-type interrupt. If an interrupt of such a type is generated in an addition instruction, the additive operation at the E stage is allowed, but either the condition code or the general purpose registers should not be renewed at the P stage. In the completion-type interrupt, the processing at the P stage is allowed since the instruction is normally completed, but the processing at the P stage of the succeeding instruction is inhibited.

If the suppression-type or nullification-type interrupt is generated when the instruction a exists in the cycle $t_3$, the processing at the P stage which is allotted to write the result of operation of the instruction a into the condition code, registers, or the main storage should be inhibited because the operating result is inhibited from being stored in the operand specified by the instruction a according to the type of the interrupt. In other words, the instruction a which has stayed at the D stage in the cycle $t_0$ advances to the A stage in the cycle $t_1$, to the L stage in the cycle $t_2$, and to the E stage in the cycle $t_3$. However, it is required to stop the pipe-line control so as to stop the storage of the result of operation to the specified operand before the operation advances to the cycle $t_4$. That is, the advance of stages has to be stopped before the pipe-line control advances beyond the cycle $t_3$. Further, in a case that the completion-type interrupt is generated when the instruction a exists in the cycle $t_4$, the advance of stages has to be stopped in the cycle $t_4$ since it is necessary to stop the pipe-line control prior to the processing of the instruction b at the P stage.

In the termination-type interrupt in which it is not necessary to maintain the contents of the operand specified by the instruction, either one of the above-mentioned stopping methods may be selected in accordance with the interruption sources. The above-mentioned operation is described, in detail, in "Computing Surveys" Vol. 9, No. 1, the Association for Computing Machinery Inc., pages 61–102 "Pipeline Architecture" by C. V. Ramamoothy and H. F. Li.

When a high-speed operation is desired for processors, it is necessary to reduce the number of computing cycles in an arithmetic unit as well as operating in the aforementioned pipe-line control mode. All instructions prepared in a processor can be processed by a fundamental arithmetic unit which includes a set of main adders, a set of shifters, a set of byte adders, and several work registers. However, in a case that such a fundamental arithmethic unit executes, for example, an instruction indicating multiplication/division or an instruction indicating the processing of floating-point operands, such an instruction will occupy a period of several to several tens cycles the main adders, shifters, or the like. However, such an instruction as employing the fundamental arithmetic unit for a long time will be executed with a reduced number of computing cycles, and thus the processing speed of the instruction will be improved, if a multiplier/divider or a floating-point adder/subtracter is incorporated to the fundamental arithmetic unit. In such a case, the execution unit is divided into two units, i.e. a floating and high speed arithmetic unit which is equipped with the multiplier/divider and the floating-point adder/subtractor for executing an instruction indicating multiplication/division and an instruction indicating floating-point arithmetic, respectively, and a general arithmetic unit which includes the main adders, shifters and/or byte adders for performing other operations than the operations executed by the floating and high speed arithmetic unit. Each of the arithmetic units is connected with the I unit, and therefore can receive from the instruction unit the operand data and control information required for its operation. Further, the arithmetic units are connected with the storage unit unit to store the results of their operations in the main storage.

However, if the execution unit is, as mentioned above, divided into the two units to reduce the number of computing cycles, a bulky hardware is required for each of the arithmetic units. Therefore, the two units cannot be placed in adjacent packaged regions. Further, when the packaged regions for the arithmetic units become large in volume, the physical distance between the two units is necessarily long, and thus it is impossible to effect at a high speed the signal transmission through signal lines between the two units. Therefore, it becomes impossible to perform in a definite machine cycle such a processing as stopping one of the two executing units by an interruption source detected in the other executing unit, and the machine cycle becomes necessarily longer.

SUMMARY OF THE INVENTION

The object of the present invention is to provide a data shunting and recovering device capable of moderating restrictions on the time interval required for the working unit to stop its operation by the generation of an interrupt.

The fundamental concept of the present invention is to delay the stoppage of the stage advance in response to the generation of interrupt by one stage as compared with the conventional system. By doing so, there may be produced such a case that the operand data can not be assured for a software since the stoppage may occur at a timing shifted from the timing specified by the software by one instruction interval. According to the present invention, there is provided a device comprising register means including a plurality of addressable registers for storing data and address means for specifying the registers. In response to addressing of the address means, data are read out of and written in the registers. The address of the register specified by the address means and the data which are read out of the register of the specified address are both held in holding means. As a result, the contents of the register can be shunted to the holding means prior to writing into the same. The shunted data in the holding means are sent back to the original register in accordance with the existing conditions. For that purpose, the device according to the present invention further comprises means for giving the data and the address held in the holding means to the register and the address means, respectively. The provision of such a data shunting and recovering device makes it possible to send back the shunted data to the original register after an interrupt has been generated, and to recover the same state as existing before the generation of interrupt. Thus, restrictions on the time interval required for the working unit to stop its operation by the generation of interrupt may be moderated, the machine cycle of the central processor is improved, and the restrictions on physical arrangements between various units may also be lightened.

BRIEF DESCRTIPION OF THE DRAWINGS

FIGS. 3 and 4 are views for explaining how instructions are controlled when an interrupt is generated.

FIG. 5 is a block diagram showing a circuit construction of registers and their neighborhood according to an embodiment of the present invention.

FIG. 6 is a timing chart for explaining the circuit shown in FIG. 5.

DESCRIPTION OF THE PREFERRED EMBODIMENT

Figure 1:
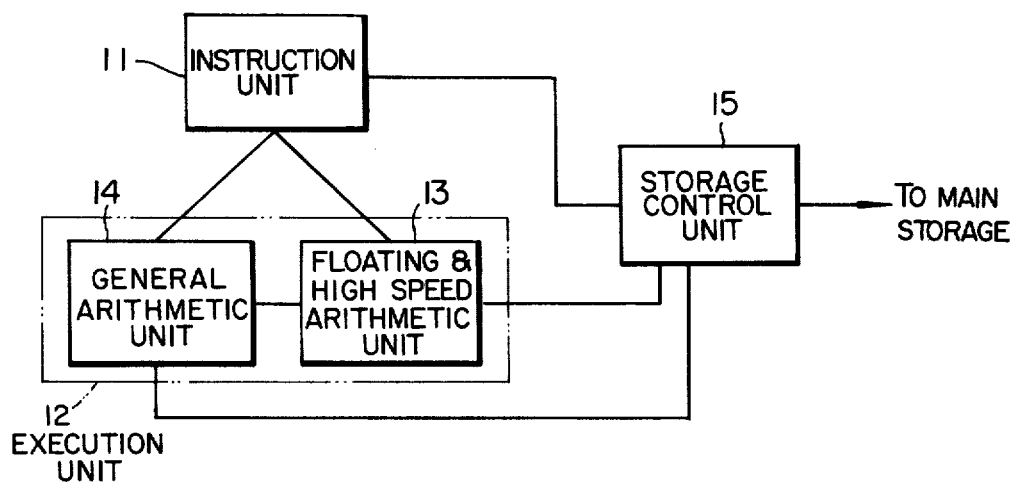
FIG. 1 is a block diagram showing a general construction of a central processor.

FIG. 1 shows a general construction of a central processor. Referring to FIG. 1, instruction unit 11 is connected with storage control unit 15 which is connected to a main storage (not shown). Further, instruction unit 11 is connected with the floating and high speed arithmetic unit 13 and general arithmetic unit 14, both of which make up execution unit 12. Storage control unit is also connected with floating and high speed arithmetic unit 13 and general arithmetic unit 14. These units have such functions as mentioned previously.

Figure 2:
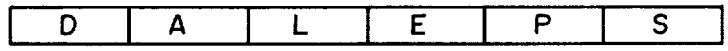
FIG. 2 is a view showing five stages at which an instruction is executed.

FIG. 2 shows processing units or stages prepared in the processor, in which an S stage store is added for the P stage (put away). The D, A, L and E stages shown in FIG. 2 are the same as those mentioned previously. The P stage is a stage at which the results of operation are written in those registers which are capable of being specified by a program stored in the processor, such as general purpose registers, floating-point registers, a condition code register and other various kinds of control registers. Though it has been mentioned hereinbefore that the writing operation to the storage is performed at the P stage, the writing operation to the storage in the present invention, is performed at the S stage subsequent to the P stage, in order to allot a time required to search an address translation management table and a buffer memory management table to the P stage.

Though the three of D, A and L stages are usually assigned as the stages controlled by the instruction unit, the number of stages which are assigned to the instruction unit may be increased or decreased. The fundamental feature of the present invention is to include the two stages of P and S after the E stage.

Figure 3:
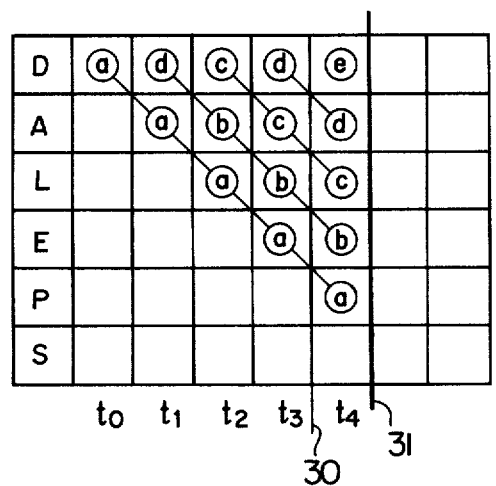

Now, there is shown in FIGS. 3 and 4 the operating states existing when an interrupt is generated in a processor having such control stages. FIG. 3 shows the operating states existing when a suppression-type or nullification-type interrupt is generated, and in particular, shows the situations when the suppression-type or nullification-type interrupt is generated for an instruction a. In other words, the advance of stage is stopped in the conventional system on the termination of the E stage of the instruction a, namely, at a time indicated by the longitudinal line 30, while according to the present invention, the advance of stage is stopped at a time indicated by the longitudinal line 31. Hence, according to the present invention, the P stage of the instruction a is executed, and the contents of those registers in the processor which are designated by a program are renewed. The above fact is an inconvenience regarding the condition of the suppression-type or nullification-type interrupt that the contents of such registers have to coincide with those before the instruction is started. There is not produced such an inconvenience with respect to the operand of the storage, since the writing to the storage is performed at the S stage.

Similarly, FIG. 4 shows the situations when a completion-type interrupt is generated for the instruction a. In the conventional systems the advance of stage is stopped on the termination of the P stage of the instruction a, namely, at a time indicated by the longitudinal line 40, while according to the present invention, the advance of stage is stopped at a time indicated by the longitudinal line 41. In this case, there is not produced such an inconvenience with respect to the instruction a itself as seen in the case shown in FIG. 3, since the S stage of the instruction a is completed, that is, since the instruction a is completely executed. However, an instruction b subsequent to the instruction a is advanced to the P stage. Thus, there is produced such an inconvenience that the writing is applied at the P stage of the instruction b to those registers in the processor which are designated by a program, is disregard of the basic requirements that in the completion-type interrupt the interrupt has to be done before the execution of the instruction b. There is not produced for the instruction b such an inconvenience with respect to the operand of the storage, since the writing operation to the storage is performed at the S stage as done in the case shown in FIG. 3. It will be clarified with reference to the following embodiments that, according to the present invention, the above-mentioned inconveniences, which result from delaying the detection of interrupt by one cycle as compared with the conventional systems, have been removed before the termination of interrupt processing.

FIG. 5 shows an arrangement of registers prepared in the present invention to solve the above-mentioned inconveniences which are temporarily generated at the time when the stages are stopped. Referring to FIG. 5, 51 indicates floating-point registers which are included in the floating and high speed arithmetic unit. The circuit arrangement shown in FIG. 5 is usually operated as follows. When a register address is set in a read address register 52, one of floating-point registers 51 is selected by means of decoder 53, and the read data are sent through signal line 57 to the execution unit. In more detail, the instruction unit sets the register address in the read address register 52 through a signal line 54, and the selection of the floating-point register is conducted at the L stage of an instruction to read an operand which is used in the execution unit. In a case that a further floating-point register is required to perform an operation of the instruction in the execution unit, another address is set through a signal line 55, and another operand is read out. When it is required to write data in the floating-point registers, the execution unit sends the written data to a signal line 56, and sets through a signal line 60 in a write address register 58 an address of a register in which the data are to be written. The contents of the register 58 are interpreted by means of a decoder 59, and the data on the signal line 56 are written in a selected one of the floating-point registers. The above-mentioned operation which has been explained in connection with FIG. 5, is the same as the operation in the conventional processors.

A circuit construction according to the present invention additionally includes a shunting address register 61 and a shunting data register 62, as shown in FIG. 5. Now, the operation of the shunting address register 61 and shunting data register 62 will be explained with reference to FIG. 6. Let us assume that the data transfer is controlled at each stage by such timing pulses as $T_0$, $T_1$, $T_2$ and $T_3$. In the writing of the floating-point registers which occurs at the P stage, the write address register 58 is first set at a time of $T_0$ of the P stage, and the contents of write address register 58 are set in the shunting address register 61 at a time of $T_1$ of the P stage. By this time, the contents of the floating-point register which has been defined by the address register 58, are read, and are set in the shunting data register 62. Subsequently, the data which are sent through the data line 56 from the E unit are written at a time of $T_2$ in one floating-point register specified by the address register 58. As a result, on the termination of the P stage, there is set in the shunting address register 61 the address of the register in which new data have been written at the P stage, and there is set in the shunting dat register 62 old data immediately before the new data are wirtten in the register. The shunting data register 62 and the shunting address register 61 can be updated only when an instruction enters the P stage, and the above-mentioned operation is performed when the floating-point registers 51 are written. Conversely, in a case that the advance of stage is stopped by an interrupt immediately after the P stage shown in FIG. 6, the contents of the registers 61 and 62 are maintained from the start of interrupt processing to the generation of another P stage where the floating-point registers are to be again written.

The P stage of the instruction a shown in FIG. 3 and the P stage of the instruction b shown in FIG. 4 are considered as extra stages which are conditioned as advancing one stage the instructions a and b, respectively, as compared with the condition thereof when normally stopped upon generation of an interrupt. Therefore, after the advance of stage is stopped by the generation of an interrupt, if the contents of the shunting address register 61 are sent back to the write address register 58, and the contents of the shunting data register 62 are sent back to one of the floating-point registers 51 which is specified by the sent-back address, the operation of the instruction a at the P stage indicated by the cycle $t_4$ in FIG. 3 can be restarted from the same condition as existing before the previous P stage operation was done. The operation of the instruction b at the P stage shown in FIG. 4 can also be restarted from the same condition as existing before the previous P stage operation was done. There are provided gates 63 and 64 to this end. Gates 63 and 64 are opened by signals on lines 65 and 66. There is applied to the line 65 a signal indicating the restoration of registers. At this time, the line 66 has another signal applied to it showing that the floating-point register 51 have been written.

Though FIG. 5 shows a circuit construction with respect to the floating-point registers, a similar circuit construction can be made for the general purpose registers included in the execution unit. That is, the shunting address register 61 and the shunting data register 62 may be arranged for the general purpose registers in a manner similar to that shown in FIG. 5. Further, another similar circuit construction can be made for a condition code register included in the G unit. However, the shunting address register is unnecessary for the condition code register, and it is enough to shunt only the condition code.

As those registers in a processor which can be referred to by a program, there are provided other various control registers for controlling a variety of modes in the processor than the above-mentioned registers. Though it is possible to prepare some shunting registers for these control registers, these control registers may be written without any shunting registers. Such writing can be conducted without seriously reducing the capability of the processor though the execution time of the instruction may be somewhat prolonged, since an instruction indicating the writing of these control registers does not frequently appear on the average. To conduct such writing, it is first checked that the S stage of the preceding instruction has been completed and a completion-type interrupt is not generated in the preceding instruction. Subsequently, after checking on the termination of the first P stage of the present instruction that a suppression-type or nullification-type interrupt is not generated in the present instruction, the control registers are written. Thus, the control registers can be written without any exclusive hardware.

Figure 7:
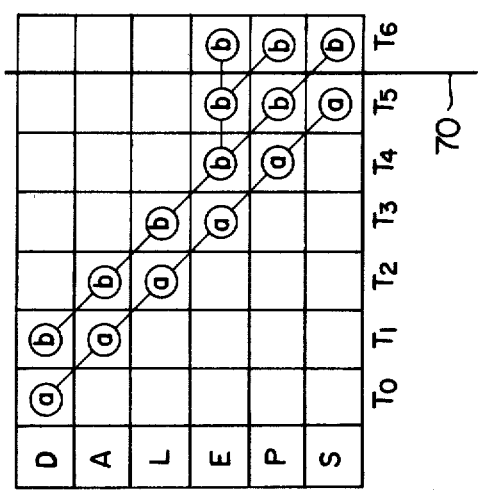
FIG. 7 is a view for explaining how registers are controlled in a case where no shunting register is provided.

FIG. 7 shows controlled states of registers in a processor having no shunting register. In FIG. 7, let us assume that the instruction b is an instruction for writing the control registers. Since the S stage of the preceding instruction terminates in the cycle $t_5$, the fact that each of the E, P and S stages of the instruction b is started on or after the cycle $t_6$ shows that a completion-type interrupt has not been generated in the preceding instruction. Further, when a suppression-type or nullification-type interrupt is generated in the instruction b, the advance of stage is stopped simultaneously with the completion of the cycle $t_5$. Therefore, the registers are not required to be written at the first P stage of the instruction b or the P stage in the cycle $t_5$, but enough to be written at the P stage on or after the cycle $t_6$. Thus, when the completion-type interrupt is generated in the preceding instruction or when the suppression-type or nullification-type interrupt is generated in the present instruction, the stages are not advanced further exceeding the longitudinal line 70 in FIG. 7. This means that the registers of various kinds can be written on or after the cycle $t_6$. To write the registers in such a manner, there should be provided in the execution unit a simplified counter circuit for counting the number of stages by which the registers can be written at the second P stage after the start of the instruction.

In the foregoing description, it has been shown that an individual shunting register is provided for exclusive use with each of the floating-point registers, general purpose registers and a condition code register. Though the shunting register stores therein the contents which are stored in each register immediately prior to the writing, all instruction prepared in a processor do not necessarily write various registers as mentioned above. Accordingly, it is required to provide a means for detecting which register has been written by the excessive execution at the P stage, and for sending the contents of the shunting register back to only the register which has been written by the excessive execution at the P stage.

Figure 8:
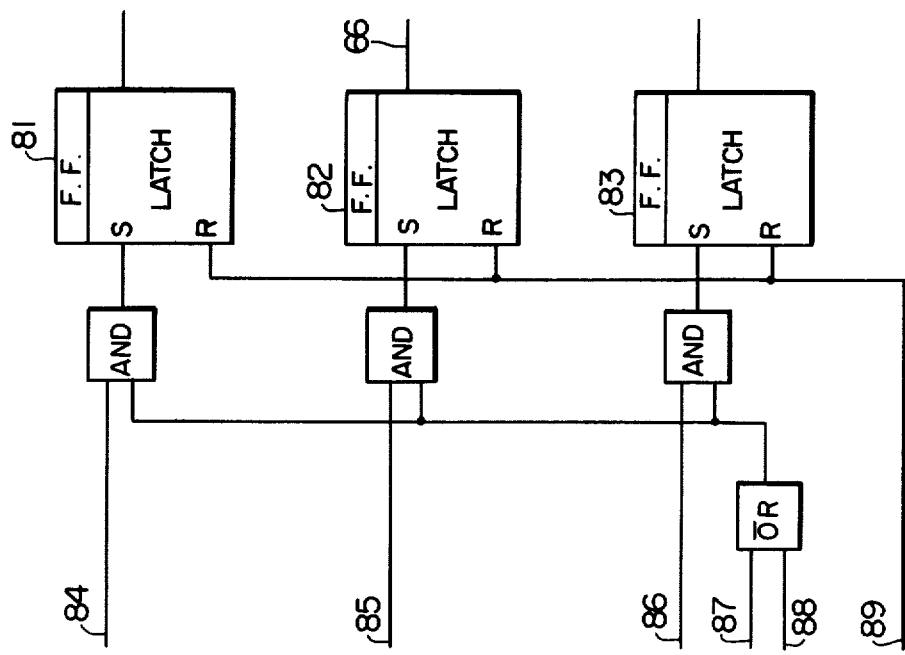
FIG. 8 is a block diagram of a logic circuit, according to another embodiment of the present invention, for identifying registers in which data have been written.

A circuit for conducting the above operation is shown in FIG. 8. Referring to FIG. 8, each of the signal lines 84, 85 and 86 is a signal line relating to the processing at the P stage. That is, the signal line 84 is for writing of the general purpose registers, the signal line 85 for writing of the floating-point registers, and the signal line 86 for writing of the condition code.

When a completion-type interrupt is generated for the instruction a in an operation shown in FIG. 7, there is generated at the S stage a completion-type interrupt detection pulse (not shown). The pulse stops the advance of stage exceeding the longitudinal line 70, and is applied to the signal line 88 shown in FIG. 8. Signal line 88 and each of signal lines 84, 85 and 86 are applied to the inputs of an AND gate, the output of which sets each of latch circuits 81, 82 and 83. In other words, when the completion-type interrupt for the instruction a is detected in the cycle $t_5$ of FIG. 7, the latch circuit 81 indicates that the general purpose registers have been written with the succeeding instruction b, the latch circuit 82 indicates that the floating-point registers have been written, and the latch circuit 83 indicates that the condition code has been written. Similarly, when a suppression-type or nullification-type interrupt is generated at the P stage of the instruction b in the cycle $t_5$, there is generated at the P stage a suppression-type or nullification-type interrupt detection pulse. The pulse stops the advance of stage exceeding the longitudinal line 70 of FIG. 7, and is applied to the signal line 87. The latch circuits 81, 82 and 83 are set in a manner similar to the above-mentioned.

The processor firstly checks the latch circuits 81, 82 and 83, when an interrupt is generated. For "1" condition of the latch circuit 81, the general purpose registers are restored by the contents of a shunting address register and a shunting data register. Similarly, for "1" condition of the latch circuits 82 and 83, similar restoring actions are carried out in the floating-point registers and the condition code, respectively. Subsequently, all of the latch circuits 81, 82 and 83 are reset by a pulse on the signal line 89. Set input line 66 of the latch circuit 82 corresponds to an input line to the gates 63 and 64 shown in FIG. 5.

The above description has explained an example of correcting the writing error in those registers which can be referred to by a program when an interrupt is generated. Such writing error may occur when the detection of interrupt is delayed by one stage in the present invention as compared with the conventional systems.

In the foregoing explanation, it has been assumed that an individual shunting register is prepared for exclusive use with each of general purpose registers and floating-point registers. However, no instructions prepared in the processor write the general purpose registers and the floating-point registers simultaneously in the same cycle. Therefore, the shunting data register and/or the shunting address register may be used for both of the general purpose registers and the floating-point registers.

Also, for a processor having an instruction rerunning means, a register which is usually written by an instruction is set as a shunting register for use in rerun at a time when the execution unit begins the operation, in order to rerun the instruction. Therefore, if there is provided such a circuit construction that the contents of the shunting register for use in rerun are kept unchanged during the execution of the P stage, an exclusive shunting register as shown in FIG. 5 is not needed. In this case, it is required merely to additionally provide a shunting register for the condition code and a function such as shown in FIG. 8.

Next, there will be explained the method of managing an instruction address which has to be communicated to a software as the instruction address in an old PSW, when an interrupt is established. By paying attention to the cycle $t_5$ in FIG. 7, it is known that there can be detected in this cycle two interrupts, one of which is a completion-type interrupt generated in the instruction a and detected at the S stage of the instruction a, the other is a nullification-type or suppression-type interrupt generated in the instruction b and detected at the P stage of the instruction b. Thus, there is a possibility for detecting simultaneously two interrupts which are generated in different instructions. However, it is required from the principle of sequence control to give a priority to the interrupt in the preceding instruction. The hardware is so constructed as to process the completion-type interrupt and to ignore the suppression-type or nullification-type interrupt, when the completion-type interrupt and the suppression-type or nullification-type interrupt are both generated simultaneously in the same cycle. In other words, when the interrupts are simultaneously detected at the S stage and the P stage, only the interrupt which has been detected at the S stage is processed.

Since an interrupt may occur, in any cycle of the processor, in two successive instructions, there is required such a circuit construction that the instruction address of the instruction in which the interrupt has been generated can be identified even if the interrupt has been generated in either one of the two instructions.

Figure 9:
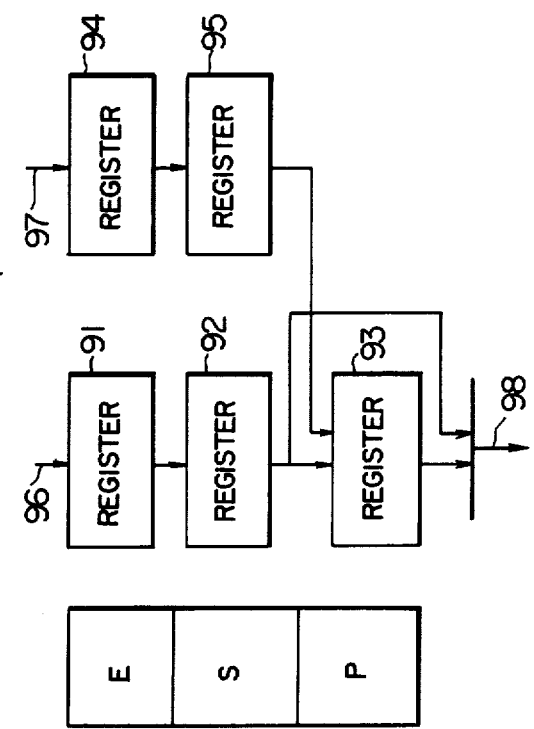
FIG. 9 is a block diagram showing instruction address registers necessary for the management of instruction address.

FIG. 9 shows a circuit arrangement of an instruction address register required to manage the above-mentioned instruction address. Instruction addresses are managed individually with respect to the respective stages. Referring to FIG. 9, reference numeral 91 indicates a register for setting therein the address of an instruction subsequent to the instruction which is now executed at the E stage. Reference numeral 92 shows a register for setting therein the address of an instruction subsequent to the instruction which is now executed at the P stage, and 93 is a register for setting therein the address of an instruction subsequent to the instruction which is now executed at the S stage. Register 94 is a register of the E stage in which the target address is set when the branch instruction is executed, and Register 95 is a register of the P stage in which the address of the branching instruction is set.

When the L stage terminates, the instruction unit sends to the execution unit operand data which are required for the operation in the E unit, and simultaneously sets through the signal line 96 in the register 91 the address of an instruction subsequent to the instruction which is sent to the execution unit. If a branch instruction is executed at the E stage, the address of the branching instruction is set in the register 94. When the E stage is completed after one cycle, the contents of the register 91 and those of the register 94 are sent to the registers 92 and 95, respectively, and are held in these registers during the P stage. Simultaneously, the address of an instruction immediately after the subsequent instruction and the address of a branching instruction are written in the registers 91 and 94, respectively. After one more cycle, the contents of the register 92 are sent to the register 93, and are held at the register 93 during the S stage, if other instructions than the branch instruction are processed. If the processed instruction is a branch instruction, it is required to decide on or before the P stage whether the branching can be effected or not. When the branching is not effected, the contents of the register 92 are transferred to the register 93. While, when the branching is effected, the contents of the register 95 are sent to the register 93.

As will be explained later, when a completion-type interrupt is generated, an instruction address which is to be stored in an old PSW, is sent through a signal line 98 out of the register 93. In this case, the address of the subsequent instruction is stored in the old PSW. Register 93 has two inputs from the registers 92 and 95 in order to be ready for the case when a completion-type interrupt is generated in a branch instruction.

As has been described, the completion-type interrupt is detected at the S stage, while the suppression-type or nullification-type interrupt is detected at the P stage. Thus, when the completion-type interrupt is generated, the contents of the register corresponding to the S stage, that is, the contents of the register 93 in FIG. 9 are read as the address of the subsequent instruction which is to be stored in the old PSW. Similarly, on the generation of a suppression-type or nullification-type interrupt, the register 92 corresponding to the P stage is selected, and the contents thereof are read out through the signal line 98.

A circuit construction similar to that shown in FIG. 9 may be applied to the instruction length codes, and the codes can be read in a similar manner and written in an old PSW, if necessary.

As mentioned above, the contents of the register 92 are read out through the signal line 98, when a nullification-type interrupt is generated in the circuit construction shown in FIG. 9. In this case, the address of the instruction in which the interrupt is generated has to be set in the old PSW. However, the register 92 contains the address of an instruction subsequent to the instruction in which the interrupt is generated. Therefore, a value indicated by an instruction length code at the P stage has to be subtracted from a value which has been read out of the register 92 in order to obtain the address of the instruction in which the interrupt is generated. The address thus obtained is stored in the storage as the instruction address in the old PSW.

In the foregoing, there has been explained an embodiment of the present invention which is characterized in that the detection of interrupt is delayed by one stage as compared with conventional processors. Though the termination-type interrupt has not been referred to in the explanation of the embodiment, it is evident that, as in conventional systems, the termination-type interrupt can be controlled in a manner corresponding to the suppression-type or completion-type interrupt.

We claim:

1. A data shunting and recovering device for use with an information system in which the execution of an instruction is carried out over a plurality of time cycles and in which said instruction execution is stopped upon generation of an interrupt, comprising:

register means including a plurality of addressable registers for storing data;

address means for specifying an address of one of said registers in order that data can be read out of and written therein;

means for delaying the stopping of said instruction execution with a delay period of at least one of said time cycles upon generation of said interrupt to allow said instruction to be executed for at least one of said time cycles following generation of said interrupt;

means operative when said register specified by said address means is to be written on execution of the instruction during said delay period for shunting and holding an address which has been specified by said address means and the data which is read out of said register, said shunting and holding being done prior to the writing of said register during said delay period; and means responsive to a signal indicating restoration of said register to restore said address held in said holding means into said address means and send said data held in said holding means to said register means thereby restoring said data into the register specified by said restored address so that said register is restored to the same state as that which existed prior to the writing of the register during said delay period.

2. A data shunting and recovering device for use with an information system in which the execution of an instruction is carried out over a plurality of time cycles and in which the instruction execution is stopped upon generation of an interrupt, comprising:

a plurality of register means for storing data, each of said register means including a plurality of addressable registers;

address means corresponding to each of said plurality of register means for specifying an address of one of said registers, in order that data can be read out of and written in said register means;

means for delaying the stopping of said instruction execution with a delay period of at least one of said time cycles upon generation of said interrupt to allow said instruction to be executed for at least one of said time cycles following generation of said interrupt;

means operative when said register specified by said address means is to be written on execution of the instruction during said delay period for shunting and holding an address which has been specified by said address means and the data which is read out of said register, said shunting and holding being done prior to the writing of said register during said delay period;

means for indicating the register means which has been actually written during the delay period; and means responsive to an indication of said indicating means and to a signal indicating restoration of said register to restore said address held in said holding means into said address means and send said data held in said holding means to said register means thereby restoring said data into the register specified by said restored address so that said register is restored to the same state as that which existed prior to the writing of the register during said delay period.

3. A data shunting and recovering device according to claim 1, wherein said address means includes first address means for use in read and second address means for use in write, and said holding means is connected to said second address means.

4. A data shunting and recovering device according to claim 2, wherein said address means includes first address means for use in read and second address means for use in write, and said holding means is connected to said second address means.

5. A data shunting and recovering device for use with an information system in which the execution of an instruction is carried out over a plurality of time cycles and in which said instruction execution is stopped upon generation of an interrupt, comprising:

register means including a plurality of addressable registers for storing data;

address means for specifying an address of one of said registers in order that data can be read out of and written therein;

means for writing said register during a predetermined stage of said instruction execution;

means for delaying the stopping of said instruction execution with a delay period of at least one of said time cycles upon generation of said interrupt to allow said instruction to be executed for at least one of said time cycles following generation of said interrupt;

shunting and holding means, operative during said delay period when said instruction execution is in said predetermined stage of instruction execution during which said register specified by said address means is written on execution of the instruction during said delay period, for shunting and holding an address which has been specified by said address means and the data which is read out of said register, said shunting and holding being done prior to the writing of said register during said delay period; and means responsive to a signal indicating restoration of said register to restore said address held in said holding means into said address means and send said data held in said holding means to said register means thereby restoring said data into the register specified by said restored address so that said register is restored to the same state as that which existed prior to the writing of the register during said delay period.

* * * * *